United States Patent
Kihara et al.

(10) Patent No.: US 9,613,272 B2
(45) Date of Patent: Apr. 4, 2017

(54) IMAGE ANALYZING DEVICE, IMAGE ANALYZING METHOD, AND RECORDING MEDIUM STORING IMAGE ANALYZING PROGRAM

(71) Applicants: Yuka Kihara, Kanagawa (JP); Hiroshi Shimura, Kanagawa (JP)

(72) Inventors: Yuka Kihara, Kanagawa (JP); Hiroshi Shimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 221 days.

(21) Appl. No.: 14/541,260

(22) Filed: Nov. 14, 2014

(65) Prior Publication Data

US 2015/0146924 A1    May 28, 2015

(30) Foreign Application Priority Data

Nov. 27, 2013 (JP) ................................ 2013-245401

(51) Int. Cl.
| | | |
|---|---|---|
| G06K 9/00 | (2006.01) | |
| G06K 9/62 | (2006.01) | |
| G06K 9/32 | (2006.01) | |

(52) U.S. Cl.
CPC ....... *G06K 9/00624* (2013.01); *G06K 9/3241* (2013.01); *G06K 9/627* (2013.01); *G06K 9/6277* (2013.01)

(58) Field of Classification Search
CPC .. G06K 9/00624; G06K 9/3241; G06K 9/627; G06K 9/6277
See application file for complete search history.

(56) References Cited

U.S. PATENT DOCUMENTS

| | | | |
|---|---|---|---|
| 8,300,935 B2 * | 10/2012 | Distante ............. | A63B 24/0021 382/103 |
| 2008/0069426 A1 * | 3/2008 | Liu ...................... | G07D 7/2025 382/137 |

(Continued)

FOREIGN PATENT DOCUMENTS

| | | |
|---|---|---|
| JP | 2007-164560 | 6/2007 |
| JP | 2009-182530 | 8/2009 |
| JP | 2013-157795 | 8/2013 |

OTHER PUBLICATIONS

Galleguillos, Carolina, et al. "Multi-class object localization by combining local contextual interactions." Computer Vision and Pattern Recognition (CVPR), 2010 IEEE Conference on. IEEE, 2010.*

*Primary Examiner* — Kim Vu
*Assistant Examiner* — Jonathan S Lee
(74) *Attorney, Agent, or Firm* — Oblon, McClelland, Maier & Neustadt, L.L.P.

(57) ABSTRACT

An image analyzing device, an image analyzing method, and a recording medium storing an image analyzing program are provided. Each of the image analyzing device, the image analyzing method, and the recording medium storing the image analyzing program recognizes an area where a target is displayed based on a feature value of an input image, generates space recognition information to recognize spatial properties of each portion of the input image, divides the image into a plurality of similar areas according to similarity in feature value of the input image, the similar area having a similar feature value, obtains specified attribute data of the spatial properties to be referred to, from image areas around the recognized area where the target is displayed, recognizes the spatial properties according to the space recognition information, and determines whether a result of recognition is appropriate at the portion where the target is displayed.

15 Claims, 8 Drawing Sheets

(56) References Cited

U.S. PATENT DOCUMENTS

| | | |
|---|---|---|
| 2008/0150968 A1 | 6/2008 | Kihara |
| 2008/0304700 A1 | 12/2008 | Kihara |
| 2009/0007019 A1 | 1/2009 | Kobayashi et al. |
| 2009/0067747 A1 | 3/2009 | Inamoto et al. |
| 2009/0074236 A1 | 3/2009 | Kihara |
| 2009/0106699 A1 | 4/2009 | Kihara et al. |
| 2009/0110300 A1 | 4/2009 | Kihara et al. |
| 2009/0119583 A1 | 5/2009 | Kihara et al. |
| 2009/0119585 A1 | 5/2009 | Sakuyama et al. |
| 2009/0141940 A1* | 6/2009 | Zhao ................ G06K 9/00295 382/103 |
| 2010/0067736 A1 | 3/2010 | Kihara |
| 2011/0052063 A1* | 3/2011 | McAuley ............... G06K 9/527 382/180 |
| 2011/0058228 A1 | 3/2011 | Inamoto et al. |
| 2011/0164283 A1 | 7/2011 | Sadasue et al. |
| 2011/0170122 A1 | 7/2011 | Kihara et al. |
| 2012/0166934 A1 | 6/2012 | Kihara |
| 2012/0263352 A1* | 10/2012 | Fan ...................... G06K 9/3258 382/105 |
| 2012/0297169 A1* | 11/2012 | Momoi ................ G06K 9/6257 712/207 |
| 2013/0265421 A1* | 10/2013 | Jia ...................... G06K 9/00241 348/143 |
| 2014/0016105 A1 | 1/2014 | Kihara |
| 2014/0049788 A1 | 2/2014 | Inamoto et al. |
| 2014/0164852 A1 | 6/2014 | Sumiyoshi et al. |
| 2014/0169680 A1* | 6/2014 | Tang ................... G06K 9/4642 382/197 |
| 2014/0204019 A1 | 7/2014 | Kihara |
| 2014/0212039 A1* | 7/2014 | Barkan ................. G06K 9/685 382/182 |
| 2014/0334676 A1* | 11/2014 | Skans ................... G06T 7/2093 382/103 |
| 2015/0049943 A1* | 2/2015 | Hamsici ............... G06K 9/4609 382/170 |
| 2015/0169638 A1* | 6/2015 | Jaber ................. G06F 17/30259 707/749 |

\* cited by examiner

LEARNING ID: 001

LEARNT IMAGE: CAR IN URBAN AREA

FEATURE VALUE: $S_{001\_1}$, $S_{001\_2}$, $S_{001\_3}$, ···

TYPE OF SPECIFIED SPACE: GROUND

DISTRIBUTION OF FEATURES AROUND TARGET: GROUND
  CLASS 1: 15%, $S_{class1\_001}$
  CLASS 2: 60%, $S_{class2\_001}$
  CLASS 3: 5%, $S_{class3\_001}$
  CLASS 4: 5%, $S_{class4\_001}$
  CLASS 5: 10%, $S_{class5\_001}$
  CLASS 6: 5%, $S_{class6\_001}$
       ···

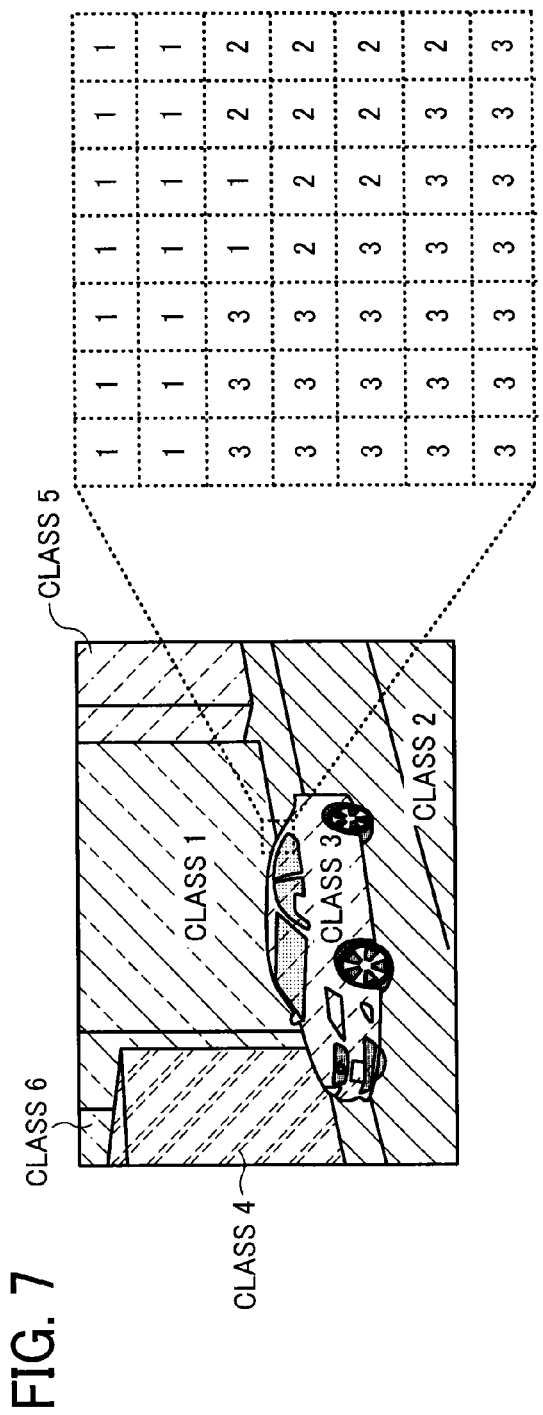

CLASS 1 : 35%
CLASS 2 : 60%
CLASS 3 : 0%
CLASS 4 : 5%
CLASS 5 : 0%
CLASS 6 : 0%

CLASS 1 : 0%
CLASS 2 : 100%
CLASS 3 : 0%
CLASS 4 : 0%
CLASS 5 : 0%
CLASS 6 : 0%

IMAGE ANALYZING DEVICE, IMAGE ANALYZING METHOD, AND RECORDING MEDIUM STORING IMAGE ANALYZING PROGRAM

CROSS-REFERENCE TO RELATED APPLICATION

This patent application is based on and claims priority pursuant to 35 U.S.C. §119(a) to Japanese Patent Application No. 2013-245401, filed on Nov. 27, 2013, in the Japan Patent Office, the entire disclosure of which is hereby incorporated by reference herein.

BACKGROUND

Technical Field

Example embodiments generally relate to an image analyzing device, an image analyzing method, and a recording medium storing an image analyzing program.

Background Art

As image recognition technology, an image analyzing technique is used by which input images are analyzed and an object or the like included in these images is identified. In such image recognition technology, reference data that indicates characteristics of the image of an object to be identified is compared with the amount of characteristic of each portion of an input image that may include the object to be identified, to specify the position at which the object to be identified is displayed on the input image.

SUMMARY

Embodiments of the present invention described herein provide an image analyzing device, an image analyzing method, and a recording medium storing an image analyzing program are provided. Each of the image analyzing device, the image analyzing method, and the recording medium storing the image analyzing program recognizes an area where a target is displayed based on a feature value of an input image to generate a recognition result, generates space recognition information to recognize spatial properties of each portion of the input image, divides the image into a plurality of similar areas according to similarity in feature value of the input image, the similar area having a similar feature value, obtains specified attribute data of the spatial properties to be referred to, from image areas around the recognized area where the target is displayed, recognizes the spatial properties according to the space recognition information, and determines whether the recognition result is appropriate at the portion where the target is displayed, based on the distribution of the similar areas of the specified spatial properties in the image areas around the recognized area where the target is displayed.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 7 illustrates an example of the results of feature dividing processes according to an example embodiment of the present invention.

FIG. 8 illustrates an example of the results of feature dividing processes according to an example embodiment of the present invention.

Figure 1:
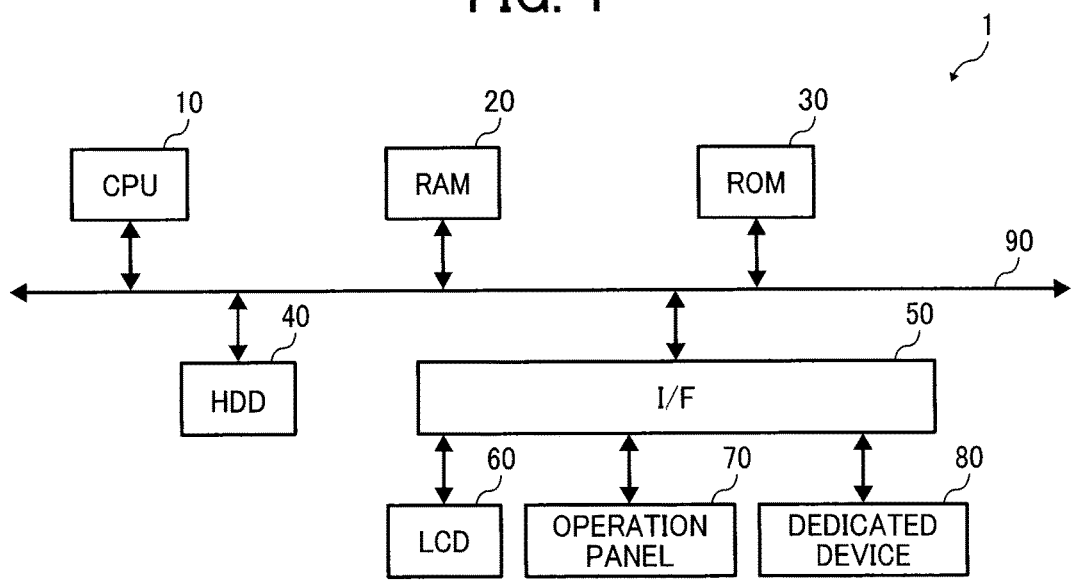
FIG. 1 is a block diagram illustrating the hardware configuration of an image analyzing device according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments of the present invention will be described below in detail with reference to the drawings. In the present example embodiment, an image analyzing device, which analyzes an input image and recognizes an object or the like included in the image, determines whether the results of recognition are reliable based on the characteristics of images around the recognized object in the input image. In the above processes, types of space in areas of an image such as "ground", "upright object", and "sky" are recognized, and the recognition results of such types of space are considered to determine the reliability. Accordingly, the reliability can be determined based on the amount of amount of characteristic of the image around a target regardless of the angle of the input image.

Firstly, the hardware configuration of an image analyzing device 1 according to an example embodiment of the present invention is described with reference to FIG. 1. As illustrated in FIG. 1, the image analyzing device 1 according to the present example embodiment has a configuration similar to that of general-purpose information processing devices such as personal computers (PCs) and servers. In other words, a central processing unit (CPU) 10, a random access memory (RAM) 20, a read only memory (ROM) 30, a hard disk drive (HDD) 40, and an interface (I/F) 50 are connected to each other via a bus 90 in the image analyzing device 1 according to the present example embodiment of the present invention. Moreover, the I/F 50 is connected to a liquid crystal display (LCD) 60, an operation panel 70, and a dedicated device 80.

The CPU 10 serves as a computation unit, and controls the entire operation of the image analyzing device 1. The RAM 20 is a volatile memory capable of reading and writing data at high speed, and is used as a working area when the CPU 10 processes data. The ROM 30 is a read-only non-volatile memory in which firmware programs or the like are stored. The volatile HDD 40 is a data readable/writable nonvolatile memory in which an operating system (OS), various kinds of control programs, applications, programs, or the like are stored.

The I/F 50 connects various kinds of hardware, networks, or the like to the bus 90, and controls these elements. The LCD 60 is a user interface that allows a user to visually monitor the state of the inspection device 4. The operation panel 70 is a user interface such as a keyboard or a mouse used by a user to input data to the image analyzing device 1.

The dedicated device 80 is a hardware device used to realize functions dedicated to the image analyzing device 1, and is, for example, a camera that captures an image to generate image data, or an application-specific-integrated-circuit that executes processes required to analyze an image at high speed.

In such a hardware configuration, the CPU 10 performs computation according to programs stored on the ROM 30 or programs read on the RAM 20 from the HDD 40 or another recording medium such as an optical disk, to configure a software controller. The software controller as configured above cooperates with hardware to configure a functional block (FIG. 2) that realizes the functions of the image analyzing device 1 according to the present example embodiment of the present invention.

Figure 2:
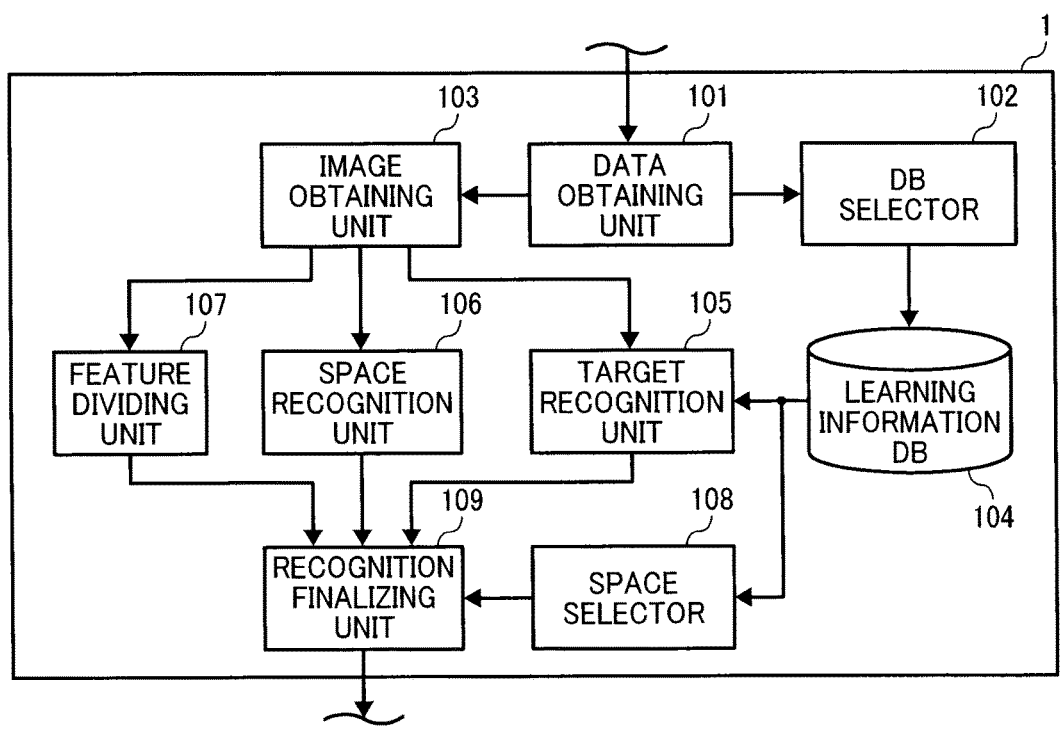
FIG. 2 is a block diagram illustrating the functional configuration of an image analyzing device according to an example embodiment of the present invention.

Next, the functional configuration of the image analyzing device 1 according to an example embodiment of the present invention is described. As illustrated in FIG. 2, the image analyzing device 1 according to the example embodiment of the present invention includes a data obtaining unit 101, a database (DB) selector 102, an image obtaining unit 103, a learning information DB 104, a target recognition unit 105, a space recognition unit 106, a feature dividing unit 107, a space selector 108, and a recognition finalizing unit 109.

The data obtaining unit 101 obtains the data of an image to be analyzed and the designation of learning information to be used for analyzing the image, through the operation made on the operation panel 70 and through the network. The DB selector 102 selects the designated learning information from the learning information stored in the learning information DB 104, based on the designated learning information obtained by the data obtaining unit 101. The image obtaining unit 103 obtains the image data of the object obtained by the data obtaining unit 101.

Figures 3, 4:
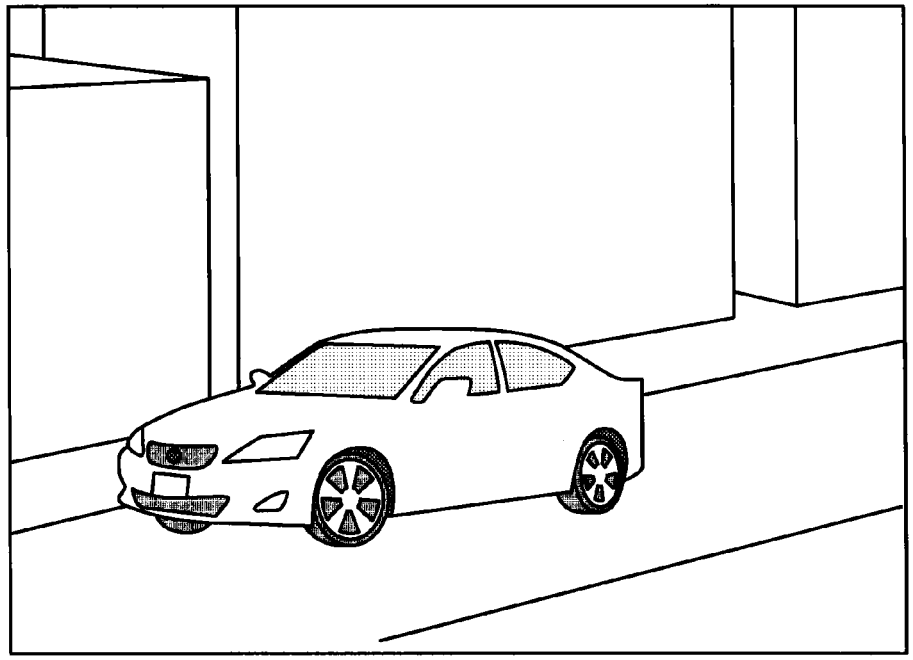
FIG. 3 illustrates an example of the data stored in a learning information DB according to an example embodiment of the present invention.
FIG. 4 illustrates an example of an image to be analyzed, according to an example embodiment of the present invention.

FIG. 3 depicts an example of the learning information stored in the learning information DB 104, according to an example embodiment of the present invention. In the learning information DB 104, the results of an analysis of a large number of images to be learnt are summarized for every situation of an image to be analyzed, as in "car in urban area" for "learnt image" of FIG. 3. As illustrated in FIG. 3, each piece of learning information includes "learning identification (ID)", "learnt image", "feature value", "type of specified space", and "distribution of features around target". Note that the learning information DB 104 serves as a learning information storage unit.

The "learning ID" is an example of identifier that identifies the learning information for each situation. The "learnt image" is the data indicating each of the situations and an object to be identified, as described above. The "feature value" indicates the photographic characteristics of an object to be identified, and includes, for example, vector data. A target object on an image to be analyzed is identified by comparing the "amount of characteristics" included in the learning information with the amount of characteristics extracted from the image to be analyzed.

The "type of specified space" indicates space in which an object to be identified exists, on an image of each situation. For example, image areas around the image area where an object to be identified is displayed are classified into types of space such as "ground", "upright object", and "sky". In a situation of "car in urban area", it is considered that the vehicle, which is the object to be identified, is normally displayed on ground. Thus, "ground" is selected.

The "distribution of features around target" indicates the states of images in image areas around an object to be identified. In the "distribution of features around target" according to the example embodiment of the present invention, the pixel values of the pixels of an image is classified into classes 1 to 6, and the ratio of each of the classes 1 to 6 in image areas around a target object is stored. Moreover, the mean value of the photographic feature values of each class is stored. The "distribution of features around target" is used as "distribution of learnt image", which is class distribution in the learning information.

Conventionally, the reliability of the results of the identification of a target object to be identified is checked based on images around a target to be identified. For example, when vehicles are to be identified in the satellite images captured by artificial satellites, the images positioned outside the road are excluded from the image areas identified as vehicles. However, such processing is only applicable to limited circumstances such as the case in which satellite images are analyzed as described above.

By contrast, in the image analysis according to the present example embodiment, the "distribution of features around target" is calculated for a certain type of space on an image. The type of space is, for example, "ground", as depicted in FIG. 3. Accordingly, the processes of checking the accuracy of identification based on image areas around an image to be identified can be applied not only to special images (e.g., satellite images as described above) but also to purposes that are more general.

In the example of FIG. 3, only "ground" is specified as "type of specified space". However, a plurality of types of space may be specified. In such a case, "distribution of features around target" is generated for a plurality of types of space. The learning information DB 104 outputs the learning information selected by the DB selector 102 from the learning information that has been generated for each situation as described above.

The target recognition unit 105 analyzes the image obtained by the image obtaining unit 103 based on the learning information sent from the learning information DB 104, and specifies an area in which an object to be identified is located in an image to be analyzed. FIG. 4 illustrates an example of an image to be analyzed according to an example embodiment of the present invention. As illustrated in FIG. 4, an image in which a driving car in an urban area is captured is an object to be analyzed in the present example embodiment.

Figure 5:
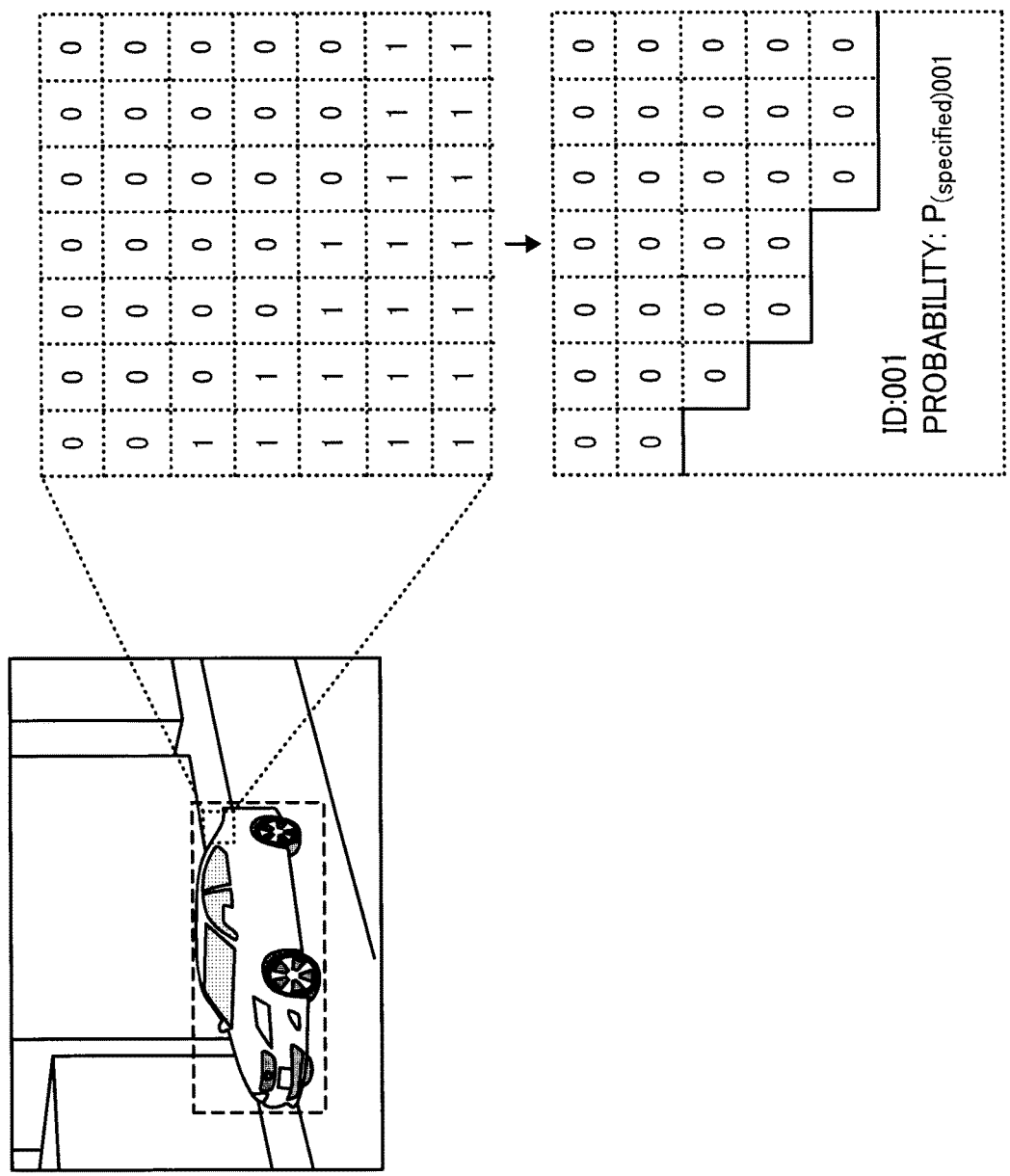
FIG. 5 illustrates the results of the recognition performed by a target recognition unit, according to an example embodiment of the present invention.

The target recognition unit 105 refers to the "feature values" described above with reference to FIG. 3, and compares these feature values with the feature values obtained by analyzing the image to be analyzed. Accordingly, an area is determined in which an object to be identified is located in an image to be analyzed. FIG. 5 illustrates the results of the recognition performed by the target recognition unit 105, according to an example embodiment of the present invention. As illustrated at top-right portion of FIG. 5, as a result of object recognition performed by the target recognition unit 105, "1" is generated when the area has an object to be identified in the pixels of the image to be analyzed and "0" is generated in the other cases.

Further, for the area of "1" where the object to be identified is supposed to be displayed as a results of recognition performed by the target recognition unit 105 as illustrated at bottom-right portion of FIG. 5, "ID" for identifying each area and "probability" for indicating the probability that an object to be identified is displayed in the area are generated. This "probability" is determined based on the degree of match in feature value as described above. By so doing, the reliability of the identified image area is checked.

Figure 6:
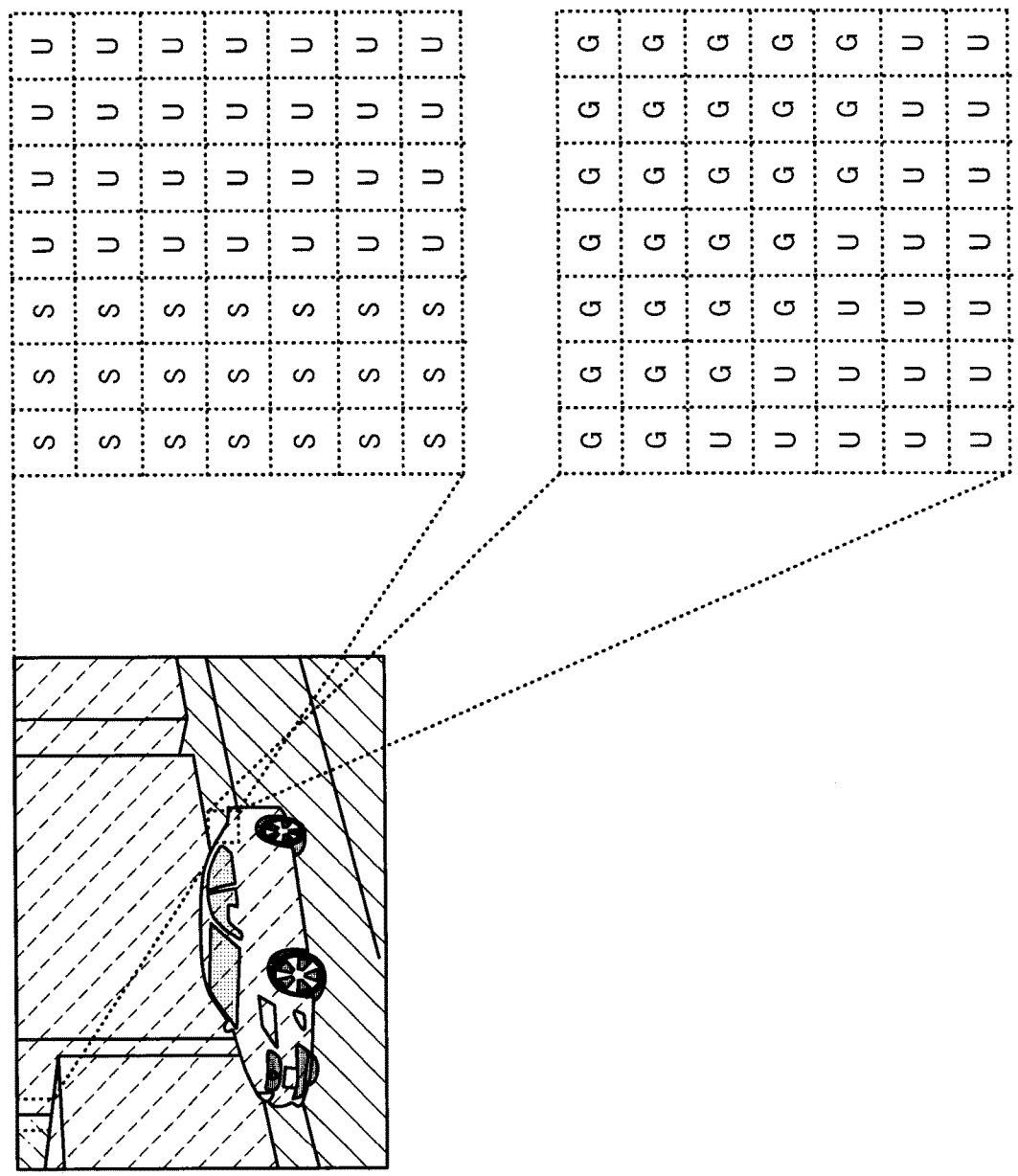
FIG. 6 illustrates an example of the results of space recognition according to an example embodiment of the present invention.

The space recognition unit 106 analyzes an image obtained by the image obtaining unit 103, and estimates the spatial structure of the image to be analyzed. FIG. 6 illustrates a result of space recognition performed by the space recognition unit 106, according to an example embodiment of the present invention. In the left side of FIG. 6, oblique solid lines indicate the image area recognized as ground, and oblique broken lines indict the image area recognized as upright object. Moreover, oblique dot-and-dash lines indicate the image area recognized as sky.

As illustrated in FIG. 6 on the right side, data in which one of "G", "U", and "S", which indicate ground, upright object, and sky, is assigned to each pixel of an image to be analyzed is generated. In other words, the space recognition unit 106 recognizes attributes of the space displayed on the input image. The data illustrated in FIG. 6 may be used as space recognition information.

The space recognition unit 106 may use several methods for recognizing space. For example, a method disclosed in "Hoiem, D., Efros, A. A., and Hebert, M. (2005). Geometric Context from a Single Image. Computer Vision, 2005. ICCV 2005. Tenth IEEE International Conference on (Volume 1), pp. 654-661, Vol. 1" may be used by the space recognition unit 106.

The feature dividing unit 107 analyzes an image obtained by the image obtaining unit 103, and divides the pixels of an image to be analyzed into classes 1 to 6 according to the degree of similarity in pixel value. In other words, the feature dividing unit 107 divides an image into several areas according to the similarity in feature value of an input image. Such a divided area has a similar feature value, and is referred to as a similar area. FIG. 7 illustrates a result of the feature dividing processes performed by the feature dividing unit 107, according to an example embodiment of the present invention. On the left side of FIG. 7, areas of classes 1 to 6 are indicated by different types of oblique lines. As illustrated in FIG. 7 on the right side, data in which one of classes 1 to 6 is assigned to each pixel of an image to be analyzed is generated as a result of the feature dividing processes.

The feature dividing unit 107 may perform feature dividing processes by using, for example, superpixel segmentation. In other words, the feature dividing unit 107 analyzes features such as color, texture, and shape of an image to be analyzed, and labels an area having a similar feature as a group of pixels. As described above with reference to FIG. 3, the image analyzing device 1 according to the present example embodiment uses classes 1 to 6 for feature dividing processes. Accordingly, the feature dividing unit 107 divides the pixels of an image to be analyzed into classes 1 to 6 in feature dividing processes.

FIG. 8 illustrates an example data of a result of feature dividing processes according to an example embodiment of the present invention. The feature dividing unit 107 calculates a mean value of the feature values of classes 1 to 6 obtained by analyzing and dividing an image to be analyzed, and stores the calculation results in a memory, such as the RAM 20, as $S_{class1}$ to $S_{class6}$.

The space selector 108 obtains the types of space to be referred to in the image recognition processes performed by the recognition finalizing unit 109, based on the learning information output from the learning information DB 104. The space selector 108 refers to the "type of specified space" described above with reference to FIG. 3, and obtains the values specified therein. Then, the space selector 108 sends the obtained values to the recognition finalizing unit 109. In other words, the space selector 108 serves as a space specification data obtainer that obtains the specified attribute data including the types of space to be referred to. Accordingly, it becomes possible for the recognition finalizing unit 109 to recognize types of space to be referred to on an image to be analyzed. The space selector 108 sends the data of "distribution of features around target" in the data of the learning information to the recognition finalizing unit 109.

The recognition finalizing unit 109 checks the reliability of the results of the recognition performed by the target recognition unit 105, based on the data generated by the space recognition unit 106 and the feature dividing unit 107, and then outputs the final identification result of the object. In other words, the recognition finalizing unit 109 determines whether the results of the recognition performed by the target recognition unit 105 are appropriate.

Figure 9:
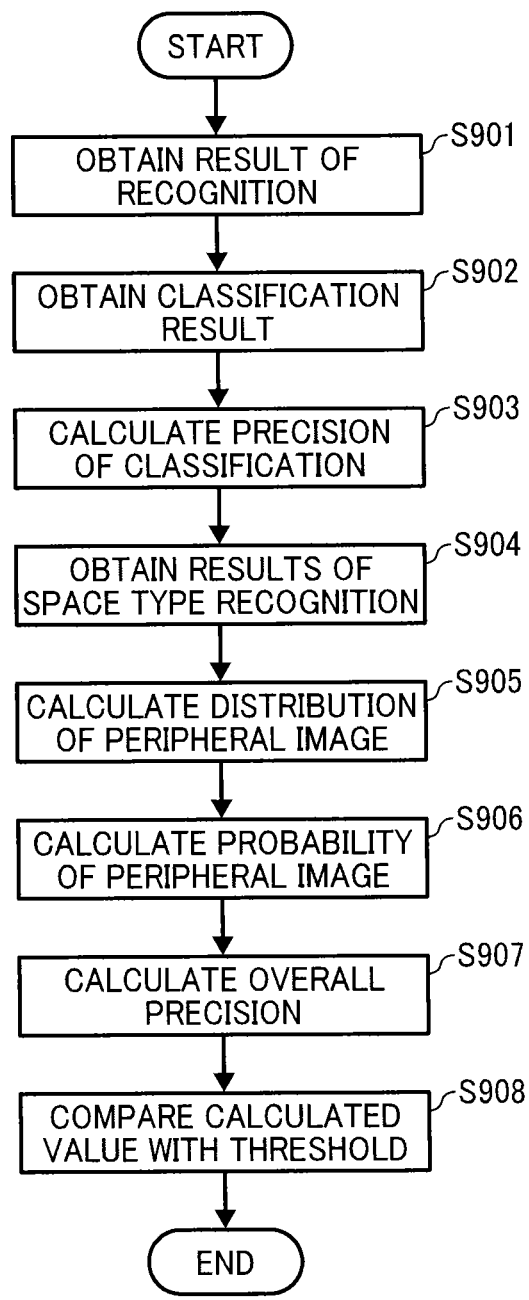
FIG. 9 is a flowchart illustrating target recognizing processes according to an example embodiment of the present invention.

FIG. 9 is a flowchart illustrating target recognizing processes according to an example embodiment of the present invention. The processes of checking the results of the object recognition performed by the recognition finalizing unit 109 are described in detail with reference to FIG. 9. As illustrated in FIG. 9, the recognition finalizing unit 109 obtains the information of the results of recognition, as described above with reference to FIG. 5, from the target recognition unit 105 (S901). Hereinafter, the information of the results of recognition may be referred to as "recognition result information". By so doing, the recognition finalizing unit 109 obtains the position of the image area on an image to be analyzed specified by the target recognition unit 105 and the probability "$P_{(specified)i}$" of the identification result of each image area. Here, "i" is a value that indicates "ID" of FIG. 5.

Next, the recognition finalizing unit 109 obtains a classification result, as described above with reference to FIGS. 7 and 8, from the feature dividing unit 107 (S902). After the classification result is obtained, the recognition finalizing unit 109 calculates the probability "$P_{(feature)k}$" of the feature division performed by the feature dividing unit 107, based on the mean value of the feature values of each class, as described above with reference to FIG. 8, and the "distribution of features around target" included in the learning information (S903). Here, "k" is a value that indicates one of classes 1 to 6.

The mean values $S_{class1-001}$ to $S_{class6-001}$ associated with the classes 1 to 6 of the "distribution of features around target" in the learning information described above with reference to FIG. 3 are mean values of the feature values of images to be learnt, and are different from the mean values of the feature values of an image to be analyzed. For this reason, in S903, a value indicating the probability of the classification is calculated based on an error in classification result between the learning results and the analytical results.

Next, the recognition finalizing unit 109 obtains the results of space type recognition, as described above with reference to FIG. 6, from the space recognition unit 106 (S904). After the results of space type recognition are obtained, the space recognition unit 106 calculates the distribution of each class of image area around the object specified by the target recognition unit 105, based on the recognition result information as illustrated in FIG. 5 and the classification result as illustrated in FIG. 7 (S905). In so doing, the recognition finalizing unit 109 calculates the distribution of the class of the types of space specified by the space selector 108.

In FIG. 7, the area of class 2 indicated by oblique solid lines, the area of class 1 indicated by solid lines and oblique broken lines, and the area of class 4 indicated by oblique double broken lines exist around the area where the vehicle is displayed. Accordingly, when the class distribution of the object area specified by the target recognition unit 105 is calculated, the distribution is divided into class 1, class 2, and class 4, as depicted in FIG. 10A.

Among the areas of class 1, class 2, and class 4, only class 2 is recognized as "ground" in the result of space type recognition illustrated in FIG. 6. Thus, if the class distribution is calculated with the types of space limited to "ground", the distribution of class 2 becomes 100% as depicted in FIG. 10B. The distribution depicted in FIG. 10B is used as an input image distribution that indicates the class distribution around the recognized area where the target is displayed on an input image.

Figures 10A, 10B, 11:
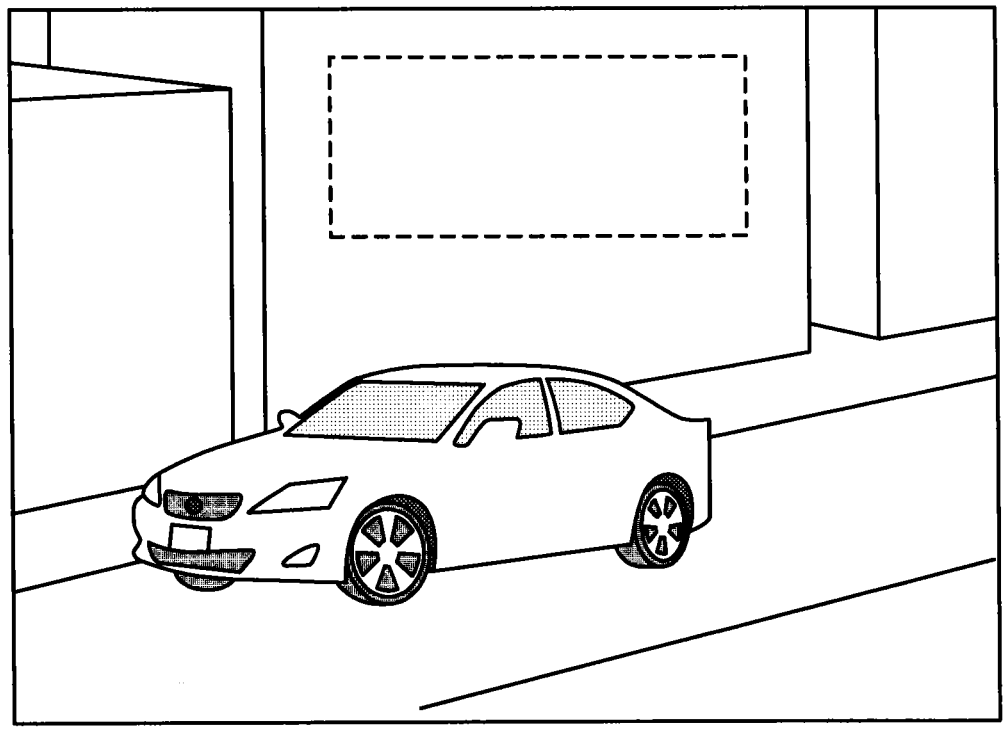
FIGS. 10A and 10B depict a result of the calculation of class distribution according to an example embodiment of the present invention.
FIG. 11 illustrates an example of erroneous recognition by a target recognition unit, according to an example embodiment of the present invention.

As described above, after the class distribution is calculated for each specified type of space, the recognition finalizing unit 109 calculates a probability "$P_{(periphery)k}$" of the class distribution of image areas around the object specified by the target recognition unit 105, based on the class distribution as depicted in FIG. 10B and the distribution information of "ground" in the "distribution of features around target" included in the learning information (S906). Here, "k" is a value that indicates one of classes 1 to 6.

As described above, after "$P_{(specified)i}$", "$P_{(feature)k}$", and "$P_{(periphery)k}$" are calculated, the recognition finalizing unit 109 calculates an overall precision Pi based on these three probabilities as in formula (1) below (S907). Note that, while formula (1) may be expressed in various other ways, the value of Pi always becomes greater in a calculation result as each of the values of "$P_{(specified)i}$", "$P_{(feature)k}$", and "$P_{(periphery)k}$" increases.

$$P_i = f(P_{(Specified)i}, P_{(feature)k}, P_{(periphery)k}) \qquad (1)$$

After the overall precision Pi is calculated, the recognition finalizing unit 109 compares the calculated value with a prescribed threshold to determine whether or not the identification result is appropriate (S908). In other words, when the calculated value of Pi is greater than a prescribed threshold, the recognition finalizing unit 109 determines that the identification result is appropriate, and outputs the data of an identification result. The output data indicates, for example, the data related to the image at top left of FIG. 5, i.e., the information of the area where an object to be identified is displayed on an image to be analyzed. When the calculated value of Pi is smaller than a prescribed threshold, the recognition finalizing unit 109 determines that the identification result is inappropriate, and abandons the identification result of the target.

In the "distribution of features around target" in an example of the learning information of FIG. 3, class 2 indicates "60%", which is a relatively high value. In the result of peripheral image distribution calculation depicted in FIG. 10B, the distribution of class 2 is calculated as "100%". Thus, a relatively high value is calculated for the "$P_{(periphery)k}$". Accordingly, the value of Pi calculated by formula (1) becomes relatively high, and the identification result is determined to be appropriate by the threshold comparison of S908.

By contrast, the recognition processes of the target recognition unit 105 may specify an area where no vehicle is displayed, as indicated by a rectangular area surrounded by broken lines in FIG. 11. Referring to FIG. 7, the periphery of the rectangular area surrounded by broken lines in FIG. 11 is classified as class 1.

Referring to FIG. 6 for the result of space type recognition, the area of class 1 is the area of "upright object". Accordingly, when the distribution of the peripheral images is calculated with the types of space limited to "ground", the distribution of any class becomes 0% in S906. Accordingly, the value of "$P_{(periphery)k}$" is calculated to be very low, and the calculation result of formula (1) also becomes very low. Accordingly, the identification result is determined to be inappropriate by the threshold comparison of S908, the identification result as illustrated in FIG. 11 is determined to be inappropriate.

Here, cases in which types of space are not considered for the identification result as illustrated in FIG. 11. In such cases, the area around the identification result of FIG. 11 is classified as class 1, and the class distribution is calculated to be nearly 100% for class 1.

When the value of "$P_{(periphery)k}$" is calculated based on the above value, the value of class 1 in the "distribution of features around target" becomes 15% as depicted in FIG. 3. Note that this value is not high, but not very low. As a result, the calculation result for Pi also becomes higher than when the types of space are considered, and may exceed a threshold referred to in S908.

When the types of space are not considered, the "distribution of features around target" as depicted in FIG. 3 is not limited to "ground", and the "distribution of features around target" is learnt from all the image areas around the target to be specified. As a result, the value of class 1 may become even greater, and may exceed a threshold referred to in S908, as described above.

In other words, by the technique where a specified object is identified by analyzing an input image, it is possible to determine the precision of identification result by analyzing the images around an image to be identified. However, even if an object to be identified is properly captured in the image, images around the object vary depending on the conditions at the time the image is captured.

If images around an object to be identified are adopted with no discrimination when learning information is generated, the "distribution of features around target" depicted in FIG. 3 becomes featureless and has no difference among classes. Accordingly, the results of calculation of the class distribution on an image to be analyzed have low reliability.

By contrast, if the type of space where little change is expected when an image is captured is specified, for example, as "ground" depending on the type of situation such as "car in urban area", as in the example embodiment described above, only the class of image corresponding to the type of space that can be a feature of an object to be identified is referred to when the value of probability of the identification result is calculated. Accordingly, it becomes possible to calculate the value of "$P_{(periphery)k}$" more precisely, and thus the precision of the processes of identifying an object or the like on an image can be improved.

In the example embodiment described above, an example case of "car in urban area" has been described. In this case, universally characteristic image on a captured image would be an area of ground where asphalt-paved road is usually displayed, and thus "ground" is selected as the "type of specified space" in the example embodiment described above. However, such a configuration is merely an example, and the "type of specified space" is variable depending on the "learnt image". For example, in the case of "flying airplane", "sky" is selected as the "type of specified space". Moreover, in the case of "animal in forests", "upright object" is selected as the "type of specified space" because it is likely that forests are captured as background.

In the example embodiment described above, cases have been described in which "ground", "upright object", and "space" are recognized as spatial properties. These properties are applicable in outdoor situations, and "floor", "upright object", and "ceiling" would be special properties in indoor situations. In other words, "under side" corresponding to under sides of the space such as "ground" and "floor" and "upper side" corresponding to upper sides of the space such as "sky" and "ceiling" are recognized as spatial properties by the space recognition unit 106.

In the example embodiment described above, cases were described in which class distribution is referred to for the image area of the spatial properties specified in the learning information among the image areas around the portion specified by the target recognition unit 105. Alternatively, the class distribution of the entire image may be referred to.

Figure 12:
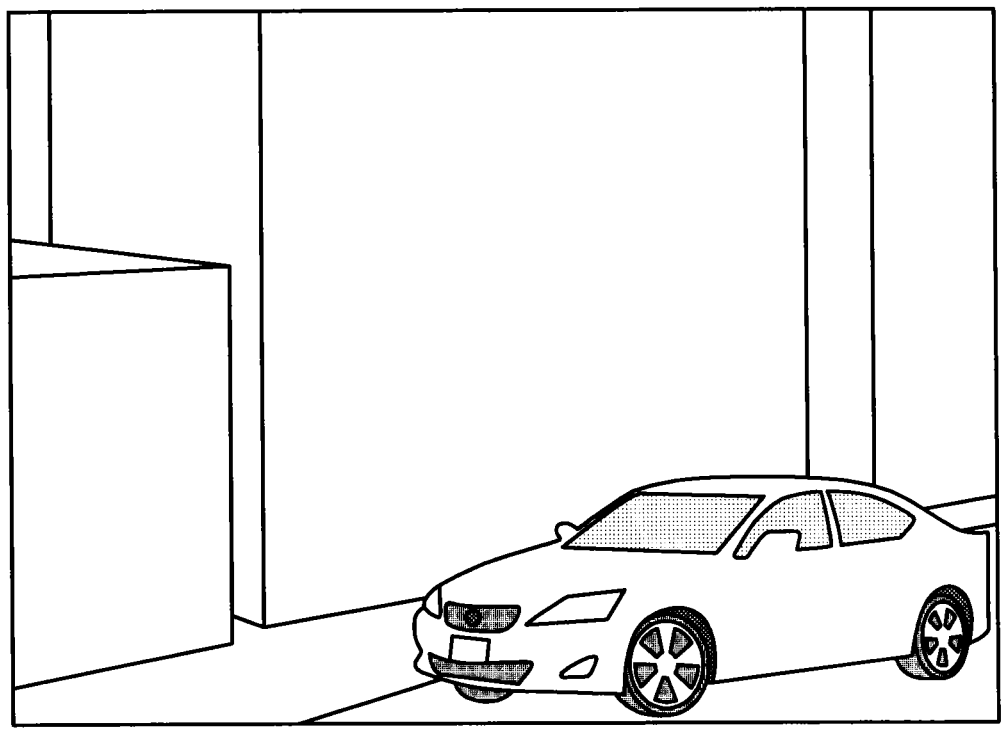
FIG. 12 illustrates another example of an image to be analyzed, according to an example embodiment of the present invention.

For example, a case in which the image illustrated in FIG. 12 is analyzed is described. When the class distribution of the entire image is analyzed, the area classified as "class 2" of FIG. 7 has a low ratio in the entire image. However, the area recognized as "ground" becomes has a very high ratio in the peripheral area of a vehicle. In such a case, the area of "class 2" in the area recognized as "ground" is considered to be a characteristic class in the periphery of a target to be specified.

For this reason, "$P_{(periphery)k}$" is calculated such that a class that has a low ratio in the entire image has greater influence on the value of "$P_{(periphery)k}$". Accordingly, in relation to a target to be specified, calculation can be performed in view of characteristic peripheral images.

The image analyzing device 1 according to the example embodiment described above can be applied to, for example, a surveillance camera. A surveillance camera identifies a person as a target in the images captured by the camera, and needs to perform learning according to the installed environment as such installed environment varies. If the image analyzing device 1 is used for a surveillance camera, a wide range of installed environment can be covered if learnt information of people with the "type of specified space" of "ground" as depicted in FIG. 3 is available.

Moreover, the image forming apparatus 1 may be applied to a vehicle-installed camera. A vehicle-installed camera captures images ahead of the vehicle, and a system that detects a vehicle, person, and obstacle ahead of the vehicle is provided for the vehicle-installed camera. However, such a system may detect, for example, a part of building or a street lamp by error. By contrast, the image forming apparatus 1 according to the example embodiment described above can avoid erroneous detection because, for example, "ground" is selected as the "type of specified space" and thus an object in midair is excluded from the detection result.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An image analyzing device, comprising:
processing circuitry configured to
recognize an area where a target is displayed based on a feature value of an input image to generate a recognition result;
generate space recognition information to recognize spatial properties of each portion of the input image;
divide the input image into a plurality of similar areas according to a similarity in feature value of the input image, each of the plurality of similar areas having a similar feature value;
obtain specified attribute data of the spatial properties to be referred to, from image areas around the recognized area where the target is displayed; and
recognize the spatial properties according to the space recognition information, and determine whether the recognition result is appropriate at the area where the target is displayed, based on a distribution of the similar areas of the specified spatial properties in the image areas around the recognized area where the target is displayed.

2. The image analyzing device according to claim 1, further comprising:
a learning information memory to store learning information including the distribution of the similar areas around the area where the target is displayed and the specified attribute data of the spatial properties to be referred to,
wherein the distribution of the similar areas in the learning information is on an area of the specified spatial properties, and
the processing circuitry is further configured to determine whether the recognition result is appropriate at the area where the target is displayed, based on an input image distribution indicating the distribution of the similar areas around the recognized area where the target is displayed on the input image, and based on a distribution of learnt image indicating the distribution of the similar areas in the learning information.

3. The image analyzing device according to claim 2, wherein the processing circuitry is further configured to perform calculation in such a manner that a greater value is obtained as the similar area being distributed on the distribution of learnt image is distributed on the input image distribution to a greater degree, and determine that the recognition result is appropriate at the area where the target is displayed when the obtained value is greater than a prescribed threshold.

4. The image analyzing device according to claim 3, wherein the processing circuitry is further configured to perform the calculation in such a manner that a greater value is obtained as the similar area being distributed to a small degree on the distribution of the similar areas on an entirety of the input image is distributed to a greater degree on the input image distribution.

5. The image analyzing device according to claim 1, wherein the processing circuitry is further configured to recognize one attribute of an under side of space, an upper side of the space, and an upright object disposed between the under side and the upper side.

6. A method of analyzing an image, the method comprising:
recognizing an area where a target is displayed based on a feature value of an input image to generate a recognition result;
generating space recognition information to recognize spatial properties of each portion of the input image;
dividing the input image into a plurality of similar areas according to a similarity in feature value of the input image, each of the plurality of similar areas having a similar feature value;
obtaining specified attribute data of the spatial properties to be referred to, from image areas around the recognized area where the target is displayed;
recognizing the spatial properties according to the space recognition information; and
determining whether the recognition result is appropriate at the area where the target is displayed, based on a distribution of the similar areas of the specified spatial properties in the image areas around the recognized area where the target is displayed.

7. The method according to claim 6, further comprising:
storing learning information including the distribution of the similar areas around the area where the target is displayed and the specified attribute data of the spatial properties to be referred to,
wherein the distribution of the similar areas in the learning information is on an area of the specified spatial properties, and
the determining includes determining whether the recognition result is appropriate at the area where the target is displayed, based on an input image distribution indicating the distribution of the similar areas around the recognized area where the target is displayed on the input image, and based on a distribution of learnt image indicating the distribution of the similar areas in the learning information.

8. The method according to claim 7, wherein the determining includes performing calculation in such a manner that a greater value is obtained as the similar area being distributed on the distribution of learnt image is distributed on the input image distribution to a greater degree, and determining that the recognition result is appropriate at the area where the target is displayed when the obtained value is greater than a prescribed threshold.

9. The method according to claim 8, wherein the determining includes performing calculation in such a manner that a greater value is obtained as the similar area being distributed to a small degree on the distribution of the similar areas on an entirety of the input image is distributed to a greater degree on the input image distribution.

10. The method according to claim 6, wherein the generating includes recognizing one attribute of an under side of space, an upper side of the space, and an upright object disposed between the under side and the upper side.

11. A computer-readable non-transitory recording medium storing a program for causing a computer to execute a method of analyzing an image, the method comprising:
recognizing an area where a target is displayed based on a feature value of an input image to generate a recognition result;
generating space recognition information to recognize spatial properties of each portion of the input image;
dividing the input image into a plurality of similar areas according to a similarity in feature value of the input image, each of the plurality of similar areas having a similar feature value;
obtaining specified attribute data of the spatial properties to be referred to, from image areas around the recognized area where the target is displayed;
recognizing the spatial properties according to the space recognition information; and determining whether the recognition result is appropriate at the area where the target is displayed, based on a distribution of the similar areas of the specified spatial properties in the image areas around the recognized area where the target is displayed.

12. The method according to claim 11, further comprising: storing learning information including the distribution of the similar areas around the area where the target is displayed and the specified attribute data of the spatial properties to be referred to, wherein the distribution of the similar areas in the learning information is on an area of the specified spatial properties, and the determining includes determining whether the recognition result is appropriate at the area where the target is displayed, based on an input image distribution indicating the distribution of the similar areas around the recognized area where the target is displayed on the input image, and based on a distribution of learnt image indicating the distribution of the similar areas in the learning information.

13. The method according to claim 12, wherein the determining includes performing calculation in such a manner that a greater value is obtained as the similar area being distributed on the distribution of learnt image is distributed on the input image distribution to a greater degree, and determines that the recognition result is appropriate at the area where the target is displayed when the obtained value is greater than a prescribed threshold.

14. The method according to claim 13, wherein the determining includes performing calculation in such a manner that a greater value is obtained as the similar area being distributed to a small degree on the distribution of the similar areas on an entirety of the input image is distributed to a greater degree on the input image distribution.

15. The method according to claim 11, wherein the generating includes recognizing one attribute of an under side of space, an upper side of the space, and an upright object disposed between the under side and the upper side.

* * * * *